INVENTOR.
WENDELL I. EVANS

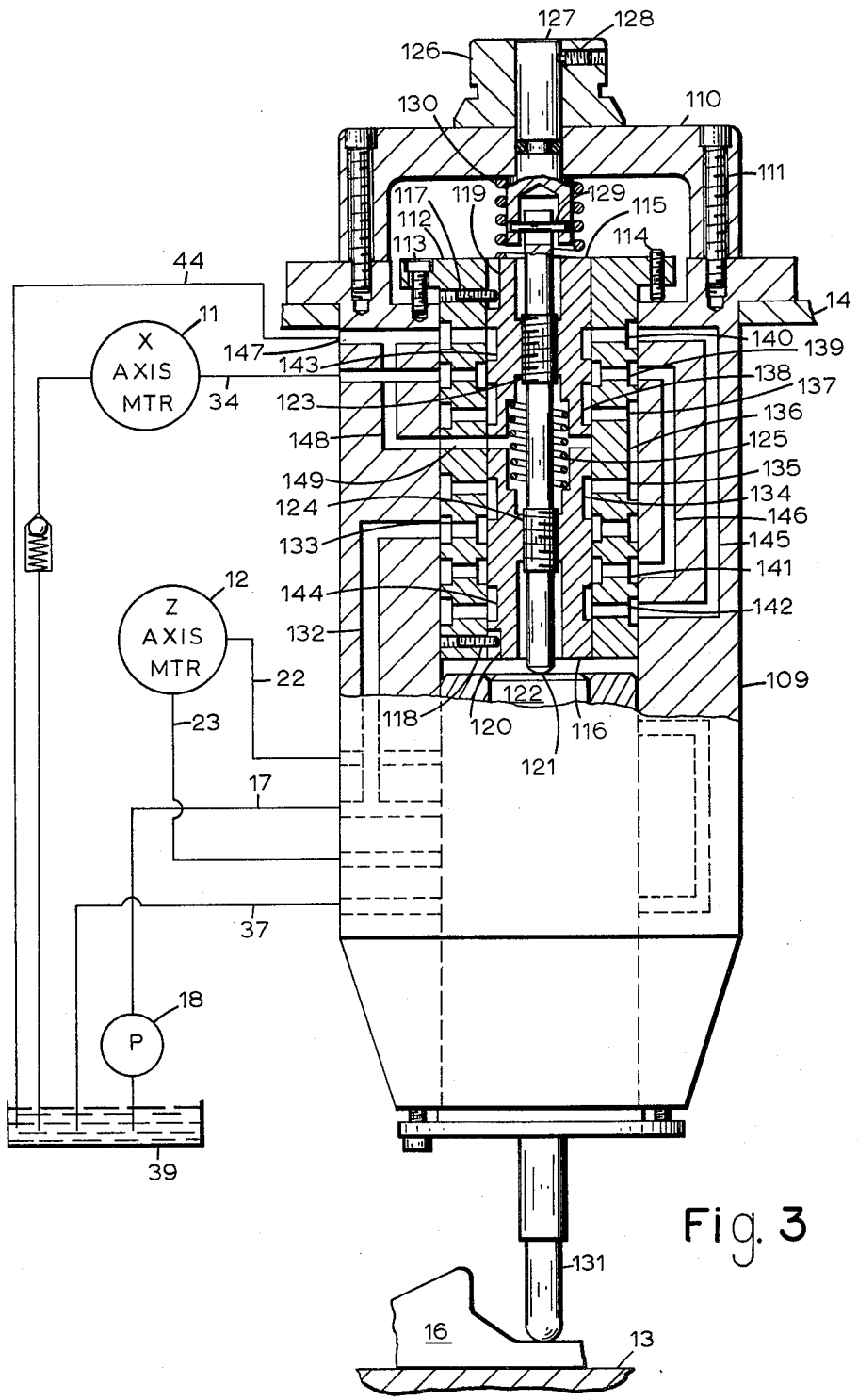

3,194,535
VALVE FOR PATTERN CONTROLLED MACHINE
Wendell I. Evans, Cincinnati, Ohio, assignor to The Cincinnati Milling Machine Co., Cincinnati, Ohio, a corporation of Ohio
Filed Oct. 31, 1963, Ser. No. 320,347
7 Claims. (Cl. 253—1)

This invention relates to pattern controlled machine tools and more particularly to a rate compensated tracer valve useful in a hydraulic system for effecting two dimension, 180 degree tracing of a pattern.

The invention is an improvement in hydraulic tracing systems such as is exemplified by the system shown in my prior U.S. Patent 3,026,680, granted March 27, 1962. An understanding of the present invention can be obtained from the following description of a prior art system and in the detailed description of the present invention following thereafter in both of which reference is made to the attached drawings wherein:

FIG. 3 shows an alternate form of a tracer valve according to this invention, shown partially in section and connected in the same control system as the valve of FIG. 2.

Figure 1:
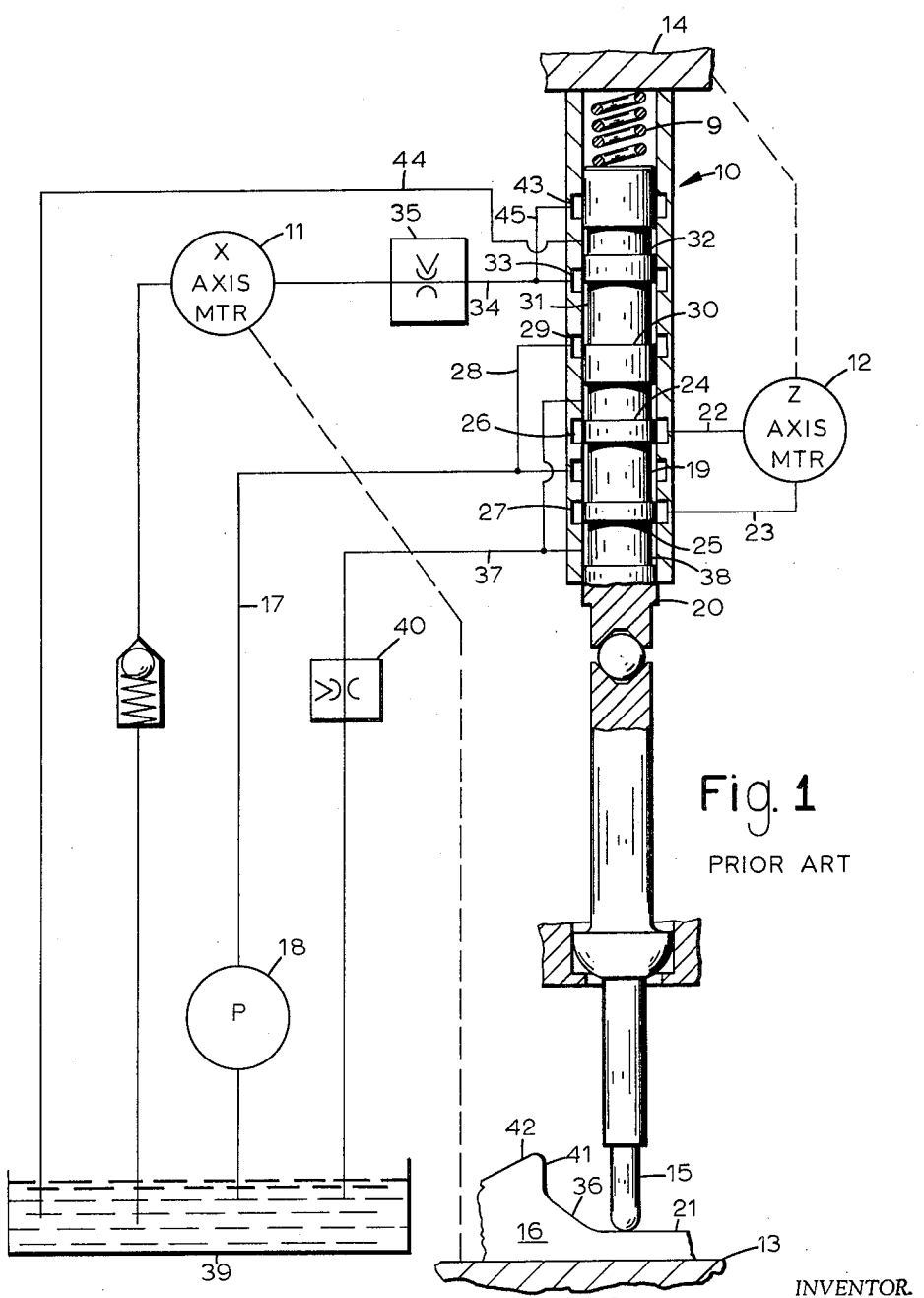
FIG. 1 is a schematic diagram of a prior art control system for a pattern controlled machine tool.

The prior art pattern actuated control system of FIG. 1 shows a tracer valve 10 which is connected in a fluid circuit of a milling machine such that it controls the operation of two fluid motors 11, 12 that are connected, respectively, to two machine tool slides 13, 14 which are moved simultaneously in such a manner that the tracer stylus 15 is caused to move over the surface of a pattern 16. In milling machines of this type, the tracer valve is carried on one slide, for example slide 14, while the pattern 16 is carried on the other slide 13 which moves in a direction at a right angle to the direction of movement of the slide 14. The slide 13 is usually the table of the machine and is often referred to as the X-axis slide while the slide 14 is commonly the tool carrier and is usually referred to as the Z-axis slide. In two dimension tracing using a milling machine of the type herein exemplified, the table 13 is moved in one direction beneath the tool carrier 14 while the latter is caused to rise and fall relative to the table 13 in accordance with the contour of the pattern 16 as it varies in elevation above the table 13 on which it is supported. Under rate compensated tracer control, the table 13 is accelerated and decelerated inversely as the tool carrier 14 is accelerated and decelerated. That is, as the table speed increases to a preset maximum, the tool carrier speed is decreased to null or zero in order that surfaces parallel to the table 13 can be traced and reproduced. In the same manner, when the spindle carrier 14 is moved at its maximum velocity, the table 13 is at a standstill to enable the apparatus to trace a surface parallel to the direction of spindle carrier movement. The same type of control is also used in tracer controlled engine lathes but in these machines it is common to use a fixed pattern and to mount to tracer valve atop a compound slide mechanism generally including a cross slide and a saddle. The saddle is moved along the longitudinal ways of the machine while the cross slide is reciprocated transversely to the longitudinal ways in accordance with the contour of the pattern.

The tracer valve 10 shown schematically in FIG. 1 operates to control both of the motors 11, 12 connected for movement of the table 13 and spindle carrier 14. Fluid under pressure is supplied to the valve 10 by a conduit 17 that connects to the high pressure discharge of a pump 18. The pressure fluid conduit 17 connects to a cannelure 19 on the spool 20 that is slidable in the valve 10 one way or the other. As shown, the spool 20 is positioned in condition to trace a flat surface 21 on the pattern 16 and therefore the fluid supplied at the cannelure 19 is blocked from both of a pair of motor lines 22, 23 by lands 24, 25, respectively, that just close ports 26, 27 to which the lines 22, 23 are connected at the valve 10. Therefore the spindle carrier motor 12 is inoperative and the spindle carrier 14 is not moved. At this same time, fluid under pressure is connected through a branch line 28 connected to a rate compensation port 29 which is only partially blocked by another spool land 30. The fluid under pressure passes around a cannelure 31 on the spool between the land 30 and another land 32 which only partially closes a second rate compensation port 33. The compensation ports 29 and 33 are each opened an equal amount at this time. Fluid under pressure moves from the port 33 into a motor line 34 through which it passes to operate the motor 11 that powers the table 13. The motor line 34 has a variable restriction rate valve 35 connected therein to control the maximum rate of operation of the motor 11 which occurs when the valve 10 and its spool 20 are as described.

When the inclined slope 36 on the pattern 16 is moved into contact with the tracer stylus 15, the arrow shown denoting the direction of travel of the table 13 at this time, the stylus 15 is swung counter-clockwise and the spool 20 is caused to move upward. The port 26 opens to allow fluid under pressure to pass around the cannelure 19 to the motor line 22. At the same time the other motor line 23 is connected to an exhaust line 37 around a cannelure 38 on the spool 20 to return fluid from the motor 12 to a reservoir 39. The exhaust line 37 has included therein a rate valve 40 the setting of which determines the maximum rate of operation of the motor 12. The ports 26, 27 will not open sufficiently to put the rate valve 40 in control until the slope 41 is engaged by the stylus 15 and therefore the lands 24, 25 and ports 26, 27 control the rate of operation of the motor while the stylus is moved along the slope 36. The upward shift of the spool 20 has caused the land 30 to restrict the fluid flow from the port 29 into the space around the cannelure 31 which operates to slow the motor 11 in correspondence with the acceleration of the other motor 12. In so acting, the land 30 and port 29 combine to take control of the rate of operation of the motor 11 to slow it to less than its maximum velocity. When the slope 41 is engaged by the stylus, the port 29 will be closed completely and the motor 11 will be stopped while the motor 12 will be operated at its maximum velocity. When the stylus 15 is moved to the sloped surface 42 the spool 20 will be shifted downward by a spring 9 to connect the motor lines 22, 23 in a reverse manner to the exhaust and pressure lines 37 and 17. The rate of operation of the motor 11 will be determined at the port 33 closed by the land 32.

The presently described prior art system operates in the manner of the system described in the previously cited Patent 3,026,680 in that the same pressure level is connected to each side of the motor 11 when the valve spool 20 is moved beyond the positions in which either of the ports 29 or 33 is just blocked. The port 43 and fluid lines 44 and 45 are provided for this purpose and operate as in the cited patent.

As can be seen from the previous brief description, there is a transition of control of the rate of operation of the motors 11, 12 which occurs in accordance with the pattern contour between the rate valves 35, 40 and the tracer valve 10. This transition condition exists whenever the rate valves 35, 40 are set to limit the rate of operation of the motors 11, 12 to some velocity less than that possible if the respective ports 29, 33 of the valve 10 are opened to their maximums. It has been found that the transition of control between the rate valves 35, 40 and the tracer valve 10 produces a sort of a "dead band" operation in which the valve spool 20 must be moved through a range of several thousandths of an inch before the transition is complete. During this "dead band," the movement of the coordinate slides 13, 14 is not accurately controlled in accordance with the contour of the pattern 16 and the fidelity of its reproduction is adversely affected.

It is therefore an object of the present invention to eliminate the use of rate valves in combination with a 180 degree, rate compensated, tracer valve.

It is also an object of this invention to provide a 180 degree, rate compensated, tracer valve capable of maintaining accurate control of a machine tool at all times.

It is a further object of this invention to provide a tracer valve in which the maximum port opening of a pair of ports controlling the rate compensated operation of a slide motor can be adjusted so that all rate control is a function of the tracer valve itself.

Figure 2:
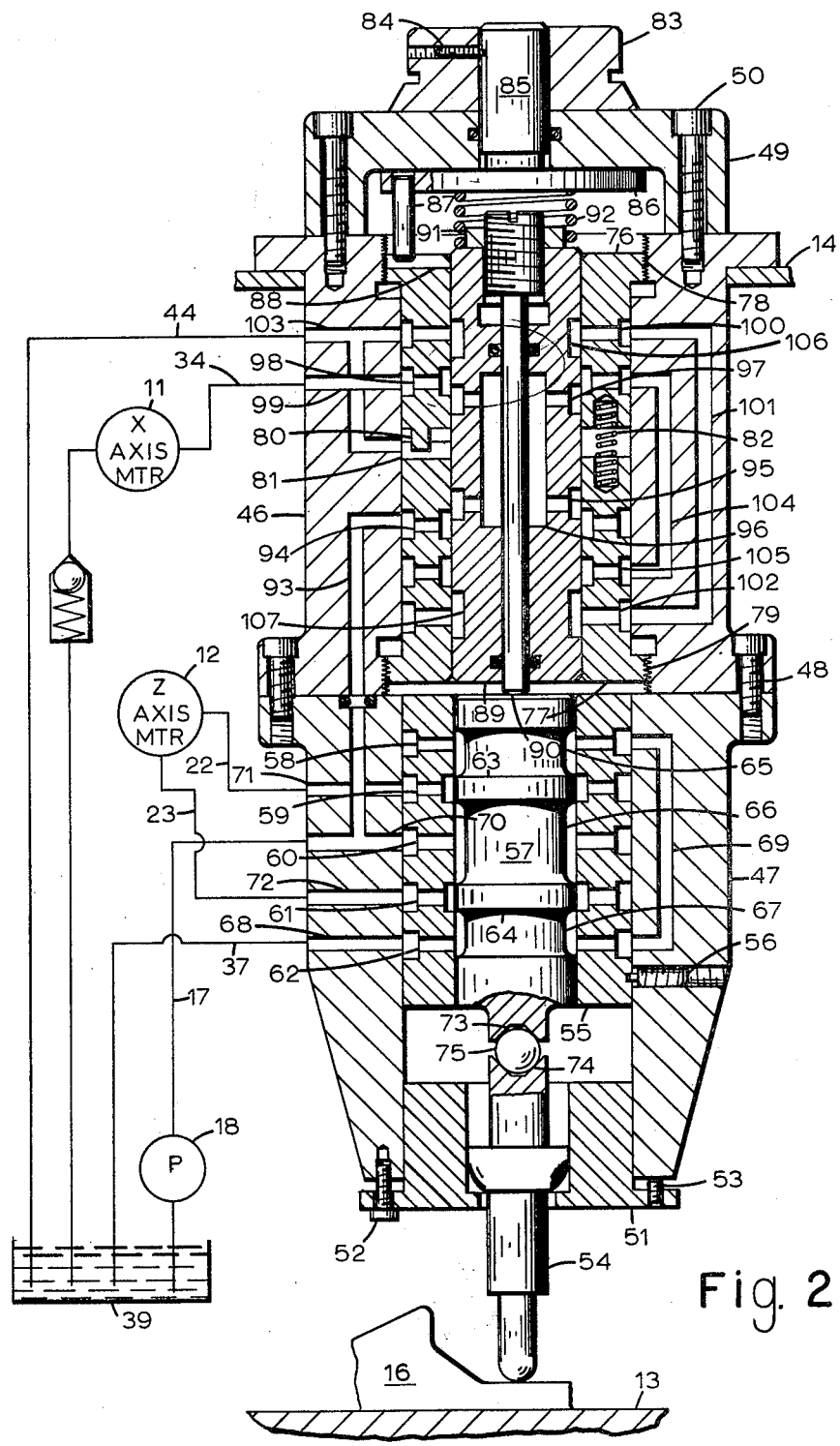
FIG. 2 is a longitudinal section view of a tracer valve constructed in accordance with this invention and is shown schematically connected in a control system.

Other objects and advantages of the present invention should be readily apparent by reference to the following portion of the specification, considered in conjunction with the accompanying drawings, particularly FIGS. 2 and 3, to which reference is made and which drawings form a part of the specification, and it is to be understood that any modifications may be made in the exact structural details there shown and described, within the scope of the appended claims without departing from or exceeding the spirit of the invention.

In accordance with the preferred form of this invention a tracer valve is provided in which means are included to adjust the maximum available opening of the rate compensation ports in a 180 degree tracer valve. The adjustment of the maximum opening of the compensation ports determines the maximum rate of operation of the motor which drives one of a pair of coordinate slides, the other slide being under reversible control of the valve also. The maximum opening of the adjustable compensation ports determines the maximum amount of movement of the tracer valve spool in completely closing the compensation ports from the full open condition. This also determines the amount of movement of the spool in the reversing valve portion through which the spool moves in opening the reversing ports from the fully closed condition to the fully opened condition. Therefore, the adjustment of the compensation ports also regulates the rate of operation of the other motor in the system by establishing the movement of the valve spool.

The invention is shown in a preferred embodiment in FIG. 2 and an understanding of the invention can be obtained from the following detailed description of the valve there shown in longitudinal section and shown schematically illustrated as connected to operate the motor 11, 12 of the system of FIG. 1. The rate valves 35, 40 of FIG. 1 are deleted from the return lines 34 and 37, respectively, in FIG. 2. The tracer valve is contained in upper and lower housing portions 46, 47, respectively, which are secured together by machine screws 48. A cap member 49 is fitted to the top of the upper housing 46 and fastened thereto by screws 50. A socket bushing 51 is inserted into the lower housing 47 and is adjustably secured therein by the combination of anchor screws 52 and spacer screws 53 both received through a flange therearound. A stylus 54 is pivotally and axially movable in the bushing 51 and extends therefrom for engagement with the pattern 16. A valve bushing 55 is fixed in the lower housing 47 by means of a set screw 56 and combines with a valve spool 57 slidably received therein to provide a reversing valve portion of the tracer valve for the control of the spindle carrier motor 12. A series of valve port openings 58 through 62 are formed through the bushing 55 and control lands 63, 64 are formed on the spool 57 to control the direction of fluid flow between various of the ports 58 through 62 around cannelures 65, 66, 67 formed on the spool adjacent to the lands 63, 64. The term "port" as used herein refers to a fluid transmitting opening through a valve member. As shown, the port 58 includes a groove around the outside of the bushing 55 and a plurality of perforations to pass fluid between the inner and outer surfaces thereof. The port 59 is comprised of inner and outer grooves in the bushing 55 and perforations to connect these grooves. The exhaust line 37 connects through interdrilling 68 to the port 62 while another passage 69 in the housing 47 directly connects the ports 58 and 62 together. (The interdrilled passages in the valve housing portions 46, 47 are shown in simplified form for purposes of this description and not as they actually occur in the valve since section views through the valve on many planes would be required and would unnecessarily complicate the disclosure herein.) The pressure line 17 connects with the port 60 through a passage 70 and the motor lines 22, 23 are connected, respectively, through passages 71, 72 to the ports 59, 61 which are shown just blocked by the lands 63, 64 so that there is no fluid moving through the lower or reversing valve portion of the tracer valve and the motor 12 is not energized. The valve spool 57 has a cone socket 73 adjacent a cone socket 74 in the stylus 54 and a ball 75 is embraced therebetween such that both axial and pivotal movement of the stylus 54 in the socket bushing 51 will cause an axial shift of the spool 57.

In the upper housing 46, two valve bushings 76, 77 are received in axial alignment with each other and with the bushing 55. The uppermost bushing 76 of the two is threadedly engaged at the flange 78 with the housing 46, the thread being a left hand thread in the illustrated valve. The bushing 77 is also in threaded engagement with the housing 46 at the flange 79 but in the specific embodiment shown, this thread is a right hand thread. Thus, the bushings 76, 77 will move in opposite axial directions when rotated in unison. To transmit rotation from the bushing 76 to the bushing 77, a set of tongue protrusions 80 are formed thereon and spaced therearound for receipt in a corresponding set of grooves 81 formed in and spaced around the bushing 77. A set of springs 82 is also received in compression between the bushings 76, 77 and the springs 82 are spaced around the two bushings intermediate the tongues and grooves 80, 81. The springs 82 provide a force acting on the bushings 76, 77 which hold the same thread flanks in engagement at the flanges 78, 79 to eliminate backlash effects when the two bushings 76, 77 are rotated together in one and the other directions. Rotation of the bushings 76, 77 is accomplished through manual rotation of a knob 83 attached by a set screw 84 to a shaft 85 journaled through the cap 49. The shaft 85 has a wide flange 86 at its end inside the cap 49 in which a crank pin 87 is fixed. The pin 87 extends into a slot 88 in the bushing 76 and transmits a rotary force thereto for rotation of both bushings 76, 77 when the knob 83 is rotated.

A valve spool 89 is slidably received through the bushings 76, 77 which, when in an adjusted position, combine with the housing 46 to provide a valve body unit and the spool 89 controls the flow of fluid therethrough. An adjusting rod 90 extends through the spool 89 and bears at one end directly against the spool 57. The other end of the rod 90 is threaded into the spool 89 thus determining its axial position therein and it is locked in its adjusted position by a lock nut 91 threaded onto the rod 90 and tightened against the spool 89. A spring 92 is compressed between the flange 86 and the spool 89 to hold the spools 89 and 57 in a spaced relationship determined by the position of the rod 90. The spring 92 also furnishes the bias on the spools 57, 89 which tend to move them downward from the position shown so that the control system will cause the spindle carrier to move downward until the stylus 54 is engaged with the pattern 16.

Fluid under pressure is connected from the passage 70 through a passage 93 that extends through both housing portions 46, 47 to a port 94 in the bushing 77. The pressure line port 94 overlaps with a port 95 in the spool 89 that opens into a chamber 96 in the spool 89 around the rod 90. A second port 97 in the spool 89 overlaps with other port 98 in the bushing 76 and the port 98 communicates freely with a passage 99 to which the motor line 34 connects so that fluid under pressure is conveyed to the table motor 11. As shown, the overlapping communication between the ports 94, 95 and the ports 97, 98 which are the terminal portions of the fluid passage through the spool 89, is equal. A shift of the spool 89 upward will result in a more restricted transfer of fluid between the ports 94, 95 and a shift of the spool 89 downward will result in a more restricted transfer of fluid between the ports 97, 98. The situation shown therefore is that which corresponds to the maximum rate of operation of the motor 11, the fluid path to the motor 11 being in its least restricted condition when the ports 94, 95 overlap the same amount as do the ports 97, 98. The overlapping condition of the two sets of ports 94, 95 and 97, 98 is adjustable by rotation of the knob 83 which will equally and oppositely shift the bushings 76, 77 as described. This results in a variation or change in the maximum rate of operation of the motor 11 since the ports 94, 95 and 97, 98 form the controlling restrictions in the fluid path to the motor 11.

The maximum rate of operation of the other motor 12 also depends upon the relative adjustment of the ports 94, 95 and 97, 98. The movement of the spool 89 upward or downward is equal to the amount of movement of the spool 57, the two being movable in unison by virtue of the construction described. The stylus 54 must be deflected a predetermined amount by engagement against a surface such as the surface 41 of the pattern 16 to shift the spools 57, 89 upward (the pattern 16 being moved left to the right at this time as indicated by the arrow) to stop movement of the table 13. Further deflection of the stylus 54 then is stopped due to the table's stopping and the spools 57, 89 do not shift upward any additional distance. Therefore the opening of the ports 59 and 61 by the upward movement of the lands 63 and 64 corresponds to the amount of movement of the spool 89 to close the ports 94 and 95 from one another. The amount of opening of the ports 59 and 61 is the controlling restrictive factor in the fluid path through the motor 12 and therefore its rate of operation is dependent upon the maximum overlap adjustment at the rate compensation ports 94, 95 and 97, 98. The rod 90 is utilized in initial valve alignment to adjust the spacing of the two spools 57, 89 so that ports 59, 61 are blocked by the lands 63, 64 when the motor 11 is operated at its maximum rate for any selected adjustment of the bushings 76, 77. The adjustment of the bushings 76, 77 does not move the spools 57, 89 and therefore the initial spacing adjustment of the spools 57, 89 does not require alteration thereafter even though the knob 83 is used to change the maximum rates of the motors 11, 12.

A port 100 is also formed in the bushing 76 and is connected by a passage 101 in the housing 46 to a port 102 in the bushing 77. The port 100 is also connected via a passage 103 to the return line 44 in the system. The port 98 is connected by a passage 104 to a port 105 in the bushing 77. Cannelures 106, 107 are formed on the spool 89 adjacent the ports 100 and 102, respectively, and it is the function of these ports 100, 102, 105, passages 101, 104 and cannelures 106, 107 to connect return line pressure to the normally high pressure side of the motor 11 so that in effect equal pressure is connected to each side of the motor 11. This prevents its creeping should the spool 89 allow leakage therearound when in the positions thereof at which the fluid flow to the motor 11 is to be stopped in the same manner as the system in the cited Patent 3,026,680 where the operation of a valve having a similar function is described in detail. A passage 108 extends from the passage 103 to the space between the bushings 76, 77 to exhaust leakage fluid from therebetween to facilitate adjustment of the bushings 76, 77.

The valve shown in partial section in FIG. 3 is an alternate construction of this invention. The reversing valve portion of this alternate valve is the same as that in the valve of FIG. 2 and therefore is not shown in sectional detail in FIG. 3. The alternate tracer valve is also shown connected in the same fluid system as the valve of FIG. 2. It is contained in a housing member 109, the upper end of which is closed by a cap 110 secured to the housing 109 by screws 111. The rate compensating portion of the valve in this case includes a single bushing 112 fixed in a selected position in the housing 109 by clamping screws 113 and spacer screws 114 to form the body of a blocking valve section. A pair of axially aligned spools 115, 116 are slidably received in the bushing 112 and are prevented from rotating therein by screws 117, 118 extending from the bushing 112 into slots 119, 120, respectively, in the spools 115, 116. An adjusting rod 121 extends through the spools 115, 116 and is engaged against the top of a spool 122 in the reversing valve portion which is identical with the spool 57, FIG. 2. The rod 121 has a left hand thread 123 with which it engages the spool 115 and a right hand thread 124 of the same pitch with which it engages the other spool 116. Upon rotation of the rod 121, the spools 115, 116 will be moved in opposite axial directions and since the threads 123, 124 are the same pitch, will be moved equal distances. A spring 125 is compressed between the spools 115, 116 to maintain a constant thread flank contact situation between the rod 121 and the spools 115, 116 to eliminate backlash in the adjusting mechanism of the valve. A knob 126 is attached to a shaft 127 by a screw 128 and is rotatably received through the cap 110. The inner end of the shaft 127 is shaped to form a cylindrical socket into which a bifurcated end of the rod 121 extends. A pin 129 is fixed in a transverse position through the shaft 127 and passes between the two sides of the end of the rod 121. Therefore, as the knob 126 is rotated, the rod 121 will also be rotated to provide the spacing adjustment of the spools 115, 116. A spring 130 is compressed between the cap 110 and the spool 115 to produce an axial bias on the spools 115, 116 and 122 tending to carry them downward so that the system will cause a downward shift of the spindle carrier 14 when the stylus 131 is not against the pattern 16.

Fluid under pressure is connected to the bushing 112 from the pressure line 17 through a passage 132 which connects to a pressure line port 133 connecting to a cannelure 134 in the spool 116 that slightly overlaps the port 133 when the spools 115, 116 are adjusted as shown. The cannelure 134 transmits fluid to a port 135 through the bushing 112. A groove 136 is formed along the bushing 112 from the port 135 to another port 137 in the bushing 112. Fluid passes through the port 137 to a second cannelure 138 in the other spool 115 that communicates in a slightly overlapped manner with a port 139 extending through the spool 115 and connected to the motor line 34. The ports 135 and 137 and the groove 136 form a fluid passage terminating at the cannelures 134, 138 through which fluid can be transmitted between the ports 133 and 139. The adjustable rate compensating restrictions in the valve result at the overlap of the cannelures 134, 138 and the ports 133, 139, respectively, and these function in the same manner as do the adjustable restrictions in the valve of FIG. 2 since one or the other of them tends to close when the spools 115, 116 are shifted in either direction from the position shown.

As in the previous valve a set of ports 140, 141, 142 is formed through the bushing 112 to communicate with cannelures 143 and 144 to which leakage fluid is passed when either of the ports 133, 139 is blocked from the cannelures 134, 138. The ports 140, 142 are connected together by a passage 145 and the port 141 is connected to the port 139 by a passage 146. The port 140 connects through a passage 147 to the return line 44. As before, the arrangement described will cause return line pressure to be connected to the normally high pressure side of the motor 11 so that there is no pressure differential between sides of the motor 11 thus to prevent it from creeping due to fluid leakage. The passage 147 is connected through a branch 148 and a port 149 to the space between spools 115, 116 to drain leakage fluid from that space to facilitate adjustment.

It has been shown that by this invention, the rate valves 35, 40 external of a 180 degree, rate compensated tracer valve as shown in the prior art system of FIG. 1 have been eliminated and the undesirable transition of rate control between those valves and the tracer valve no longer occurs in the improved 180 degree tracing system of this invention. The tracer valve of the invention is always in control of the operation of the motors 11, 12 and as a result, the pattern 16 is more accurately traced by the coordinated movement of the machine slides 13, 14.

What is claimed is:

1. In a tracer valve for use in a rate compensated, 180 degree, fluid actuated tracing apparatus, the valve having a reversing valve section and a blocking valve section, the latter section comprising:
   (a) a body,
   (b) a motor line port in said body,
   (c) a pressure line port in said body and spaced from said motor line port,
   (d) a spool slidable one way and the other in said body from a center position,
   (e) a pair of fluid channels in said spool, said channels overlapping the pressure line port and the motor line port, respectively, by equal amounts when said spool is in the center position,
   (f) means to connect said channels serially to one another, said ports and channels defining a minimum restriction to fluid flow through said body when equally overlapped, and
   (g) means equally to adjust the overlap of said channels and the respective ports and alter said minimum restriction.

2. In a tracer valve for use in a rate compensated 180 degree, fluid actuated tracing apparatus the valve having a reversing valve section and a blocking valve section the latter section comprising:
   (a) a body,
   (b) a motor line port in said body,
   (c) a pressure line port in said body and spaced from said motor line port,
   (d) a spool slidable one way and the other in said body from a center position,
   (e) a pair of spaced fluid channels in said spool, said channels overlapping said pressure line and motor line ports, respectively, by equal amounts when said spool is in the center position,
   (f) means to connect said channels serially to one another, said motor line and pressure line ports and channels defining a minimum restriction to flow through said body when equally overlapped, and
   (g) means including two sets of inter-engaged threaded surfaces of opposite hands to alter the relative spacing between said motor and pressure line ports and said fluid channels to adjust said minimum restriction.

3. In a tracer valve for use in a rate compensated 180 degree, fluid actuated tracing apparatus, the valve having a reversing valve section and a blocking valve section, the latter section comprising:
   (a) a housing,
   (b) a pair of valve bushings axially aligned in said housing, one of said bushings having a motor line port communicating radially therethrough, the other of said bushings having a pressure fluid line port communicating radially therethrough,
   (c) a spool slidably received through said bushings for axial movement one way and the other from a center position therein,
   (d) a pair of spaced fluid channels in said spool, said channels overlapping said pressure line and motor line ports, respectively, by equal amounts when said spool is in its center position,
   (e) means to connect said channels serially to one another, said ports and channels defining a minimum restriction to flow through said bushing and housing when equally overlapped, and
   (f) means relatively to shift said bushings in the axial direction in said housing to alter the spacing between said motor line and pressure line ports and correspondingly alter said minimum restriction.

4. In a tracer valve for use in a rate compensated, 180 degree, fluid actuated tracing apparatus, the valve having a housing enclosing a reversing valve section and a blocking valve section, the latter section comprising:
   (a) a pair of valve bushings axially aligned in the housing, one of said bushings having a motor line port radially extending therethrough and a surface in threaded engagement with the housing, the other of said bushings having a pressure line port extending radially therethrough and a surface in threaded engagement with the housing, the threaded surfaces of said bushing being of opposite hands,
   (b) a spool slidably received through said bushings for axial movement one way and the other from a center position therein,
   (c) a pair of spaced fluid channels in said spool, said channels overlapping said pressure line and motor line ports, respectively, by equal amounts when said spool is in its center position,
   (d) means to connect said channels serially to one another, said ports and channels defining a minimum restriction to fluid flow through said blocking valve section when equally overlapped, and
   (e) means to rotate said bushings in unison in the housing to alter the spacing between said motor line and pressure line ports and adjust said minimum restriction.

5. In a tracer valve for use in a rate compensated, 180 degree, fluid actuated tracing apparatus, the valve having a reversing valve section and a blocking valve section, the latter section comprising:
   (a) a body,
   (b) a motor line port in said body,
   (c) a pressure line port in said body and spaced from said motor line port,
   (d) a spool slidable one way and the other in said body from a center position, said spool including two spaced sections, one spool section having a channel therein and the other spool section having a channel therein, said channels overlapping the motor line and pressure line ports, respectively, by equal amounts when said spool is in the center position thereof,
   (e) means to connect said channels serially to one another in a fluid path, said ports and channels defining a minimum restriction to fluid flow through said body when equally overlapped, and
   (f) means relatively to shift said spool sections axially and to maintain them in a selected spaced relation to adjust said minimum restriction.

6. In a tracer valve for use in a rate compensated, 180 degree, fluid actuated tracing apparatus, the valve having a reversing valve section and a blocking valve section, the latter section comprising:
(a) a body,
(b) a motor line port in said body,
(c) a pressure line port in said body and spaced from said motor line port,
(d) a spool slidable one way and the other in said body from a center position, said spool including two spaced sections and an adjusting rod in threaded engagement through each of said spool sections, the threaded engagement with one spool section being of a hand opposite to the hand of the threaded engagement of the other spool section, each of said spool sections having a fluid channel therein, one and the other of said channels overlapping said motor line and pressure line ports, respectively, by equal amounts when said spool is in the center position,
(e) means to connect said channels serially to one another in a fluid path, said channels and ports defining a minimum restriction to fluid flow through said body when equally overlapped, and
(f) means to rotate said adjusting rod in said spool sections to alter the spacing between said spool sections channels and adjust said minimum restriction.

7. A tracer valve for simultaneous control of two motors in a rate compensated, 180 degree, fluid actuated tracing apparatus comprising:
(a) a first valve body section,
(b) a first valve spool reciprocally movable in said first valve body section from a null position to direct fluid through said first valve body section in a direction and at a rate dependent upon the direction and amount of movement of said first valve spool from the null position thereof,
(c) means to connect said first valve body section to one of said motors for control thereof in accordance with the fluid flow therethrough,
(d) a second valve body section,
(e) spaced rate control ports in said second valve body section,
(f) a second valve spool reciprocally movable in said second valve body section,
(g) a fluid passage including terminal portions in said second valve spool, said terminal portions adapted to overlap one and the other of said spaced rate control ports equally when said second valve spool is in a minimum restriction position in said second valve body section,
(h) means to connect said second valve body section in fluid circuit with the other of said motors for control of the rate of operation thereof in accordance with the volume of fluid flow from one of said rate control ports to the other thereof through said fluid passage,
(i) means to maintain said first and second valve spools movable in unison and in a spaced relation wherein the first valve spool is in its null position when said second valve spool is in its minimum restriction position, and
(j) means to relatively adjust the overlap of each of said terminal portions and said rate control ports to alter the maximum volume of fluid flow through said second valve body section when said second valve spool is in the minimum restriction position.

References Cited by the Examiner
UNITED STATES PATENTS
2,958,501 11/60 Pickett et al. _____ 251—3
3,026,680 3/62 Evans _____ 60—97

JULIUS E. WEST, *Primary Examiner.*
EDGAR W. GEOGHEGAN, *Examiner.*